United States Patent [19]
Fizer

[11] 3,987,247
[45] Oct. 19, 1976

[54] DATA SIGNALLING UNIT FOR TELEPHONE SYSTEMS

[75] Inventor: William C. Fizer, Roanoke, Va.

[73] Assignee: American Motor Inns, Inc., Roanoke, Va.

[22] Filed: Dec. 12, 1975

[21] Appl. No.: 640,346

[52] U.S. Cl. .............................................. 179/2 A
[51] Int. Cl.² ........................................ H04M 11/00
[58] Field of Search ................. 179/2 DP, 2 R, 2 A, 179/90 AN

[56] References Cited
UNITED STATES PATENTS

| | | | |
|---|---|---|---|
| 3,674,941 | 7/1972 | Guetta | 179/90 AN |
| 3,675,204 | 7/1972 | Miehle et al. | 179/2 A |
| 3,819,862 | 6/1974 | Hedges | 179/2 A |
| 3,854,009 | 12/1974 | Pirnie | 179/2 A |
| 3,924,071 | 12/1975 | Pirnie | 179/2 A |

Primary Examiner—George G. Stellar

[57] ABSTRACT

A data signalling system for in-house telephone systems of either the rotary dial or the tone dial type responds to conventional digit defining dial signals.

Control gates respond to conventional trunk relay signal patterns to trigger various logic functions in conjunction with trunk seize, dialing and hang-up.

A numeric printer is fed digital signals from logic circuitry which has accumulated and stored the dialed data and is capable of presenting numeric and alpha display.

15 Claims, 7 Drawing Figures

FIG. 1
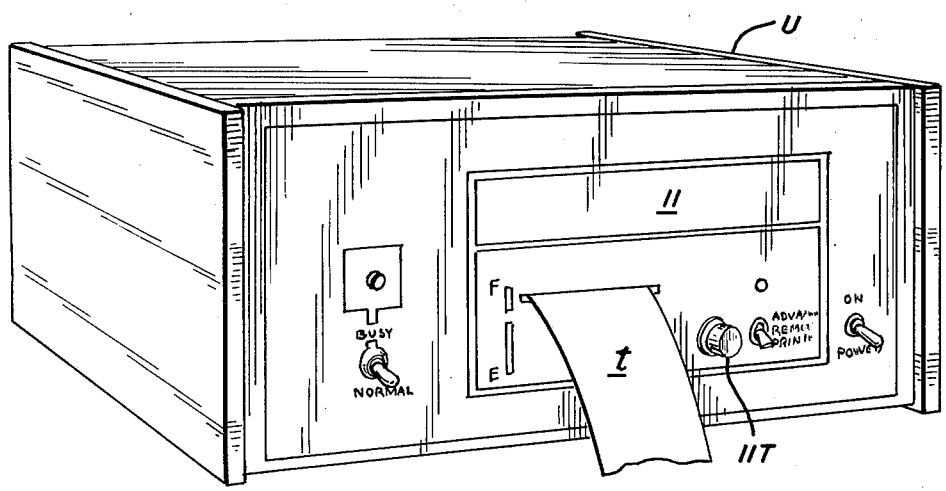
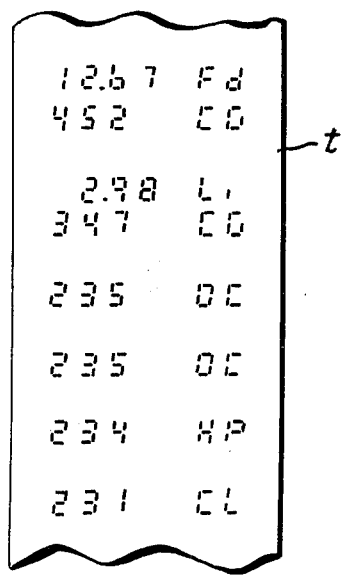
FIG. 1A

DATA SIGNALLING UNIT FOR TELEPHONE SYSTEMS

BACKGROUND OF THE INVENTION

This invention relates to remote signalling systems for use with in-house telephone systems and more particularly is concerned with a data signalling system that may be connected to operate through a PABX system without need for any modifications to any of the existing equipment.

Numerous applications for remote signalling systems are found in connection with the conventional in-house telephone systems that are used in motels, hotels, hospitals and the like. Such systems typically include a plurality of area or room telephones each being either of the conventional rotary dial or tone dial signalling type and each having a separate telephone line, a plurality of trunk lines, and a central telephone switching unit such as a PABX system operable to selectively control connection between the telephone lines and the trunk lines.

Various types of signalling systems for indicating room status have been proposed for motel and hotel use, for example: See U.S. Pat. Nos., 3,614,325; 3,742,141; 3,777,065; 3,854,009; and 3,892,922. Such systems are complex and require various modifications to the conventional telephone system which in general are unduly expensive. In addition, these systems require access to the telephone lines of each room and seriously lack versatility and flexibility.

While there is general agreement as to the value of remote signalling systems in conjunction with in-house telephone systems, the marketing needs have not been met because of the above mentioned drawbacks to the prior systems.

SUMMARY OF THE INVENTION

The present invention provides a remote type data signalling system that features ease of installation; that actually requires no modification of existing telephone systems; that enables data to be transmitted from any one of the in-house phones and that can be adapted to all types of data reporting functions that may arise in connection with the particular business situation.

The invention is suitable for use with either rotary dial or tone dial systems and has good noise rejection and isolation to preclude responding to false signals and to avoid interfering with the operation of the phone system.

More particularly, the invention provides a data signalling systems operable through an in-house telephone system that includes a plurality of area telephones each having a telephone line, a plurality of trunk lines, and central telephone switching means operable to selectively control connection of the telephone lines to the trunk lines, the signalling system having input digit clock means connected to produce a first digit clock signal in response to selection of one of the trunk lines by any selected one of the area telephones and connected to produce a sequential digit clock signal in response to each subsequently dialed digit received from the selected trunk, logic means responsive to each digit clock signal to receive from the selected trunk line each sequentially transmitted set of conventional digit defining telephone dial signals transmitted by the selected area telephone and to convert each set to a separate corresponding set of digital signals representative of the corresponding dialed digit, and utilization means responsive to each separate set of digital signals to provide a digital read-out representative of such sets of telephone dial signals.

The disclosed embodiments utilize a digital printer to present a display that can be triggered either in response to a pre-determined digit code or in response to hang-up. While the illustrated printer is a numeric device, a unique over-ride circuit arrangement causes the printer to print alpha characters.

Additional features include use of control gates triggered by unique signal patterns of the type generated by the conventional A, B and C telephone trunk relays.

Further features that evidence the versatility of the system include the simplicity of handling not only status data but data such as restaurant charges and time of day information.

The system readily accommodates memory functions wherever an accumulation of data need be presented.

Other features and advantages of the invention will be apparent from the following description and claims, and are illustrated in the accompanying drawings which show structure embodying features of the present invention and the principles thereof.

BRIEF DESCRIPTION OF THE DRAWINGS

In the accompanying drawings forming a part of the specification, and in which like numerals are employed to designate like parts throughout the same:

FIG. 1 is a perspective view of a desk top console unit incorporating an electronic data signalling system in accordance with this invention;

FIG. 1A is a fragmentary view illustrating a section of paper tape having print-out data illustrating the format in which the data is presented;

GENERAL DESCRIPTION

Figure 2:
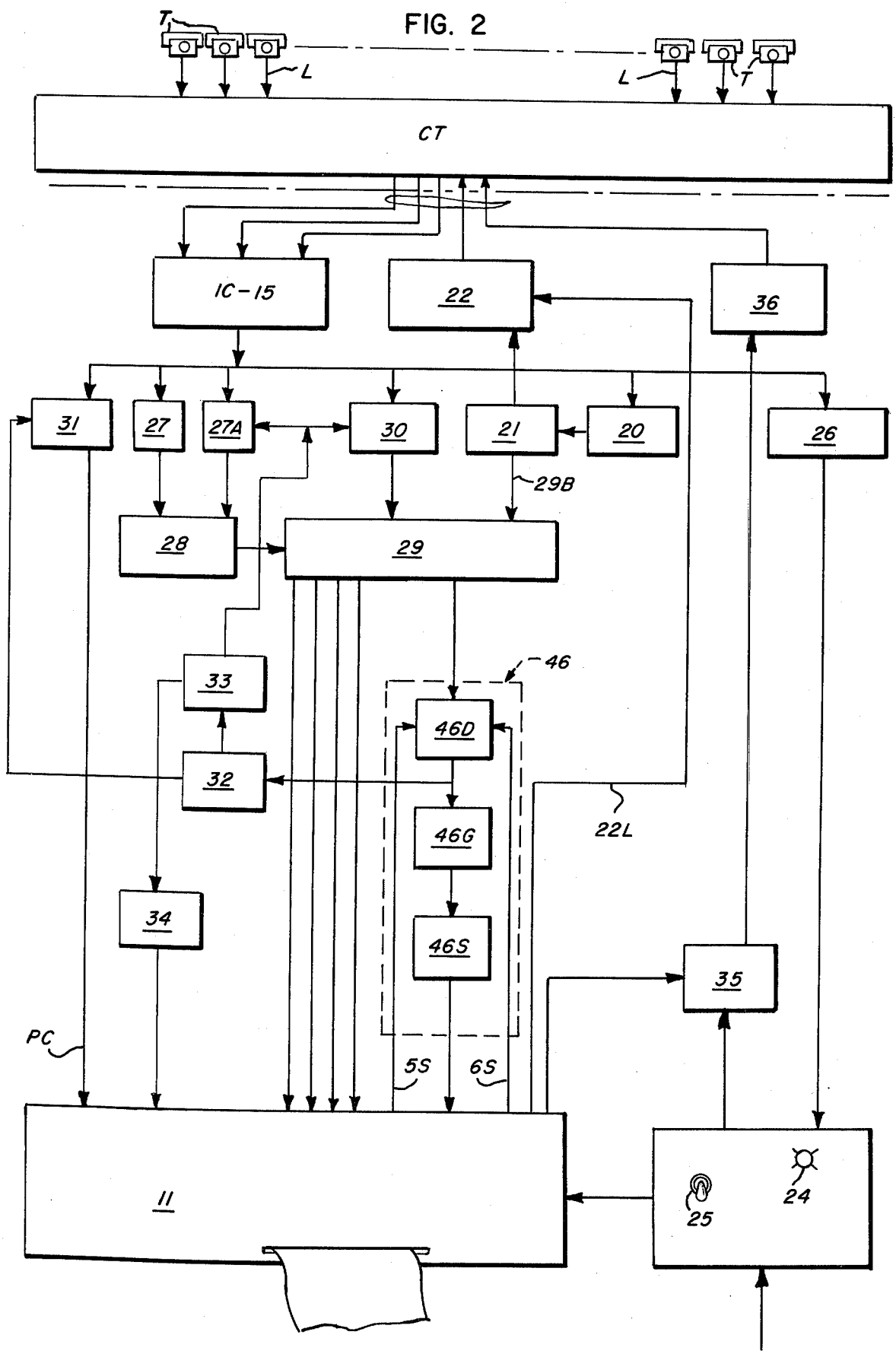
FIG. 2 is a block diagram illustrating an in-house telephone system in association with a first embodiment of the data signalling system of this invention.
Figure 5:
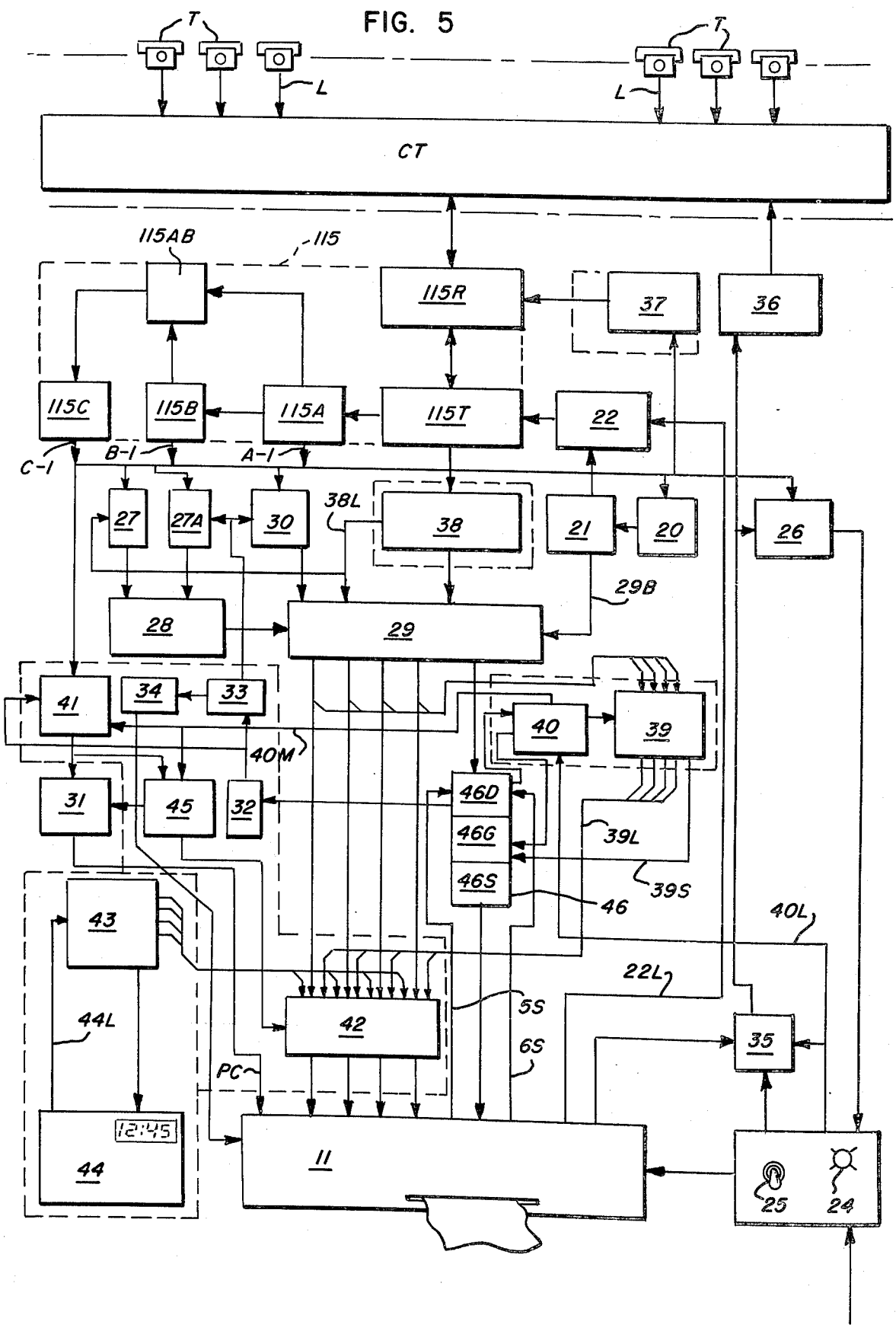
FIG. 5 is a block diagram illustrating a second embodiment of the invention adapted for use with telephone systems of either the dial pulse type or the tone dial type.

Referring now to the drawings, two specific embodiments of an electronic data signalling system, as disclosed herein in block diagram form in FIGS. 2 and 5, are arranged for direct connection to an in-house telephone system. Such a telephone system conventionally includes a plurality of area telephones T each having a telephone line L leading to a central telephone switching means such as a PABX which is generally indicated at CT and includes a plurality of conventional trunk lines. As is well known, the PABX is operable to selectively control connection of the telephone lines to the trunk lines. Typically, a pre-determined trunk is selected by dialing a particular access digit, for example, dialing 9 usually selects an outgoing trunk.

Each of the electronic data signalling systems shown in FIGS. 2 and 5 is arranged to be connected to the telephone PABX equipment via a control cable. In the FIG. 2 embodiment, the control cable has five pairs of wire and the system is specifically designed for connection to certain existing in-house telephone systems wherein the area telephones are of the dial pulse type. In the FIG. 5 embodiment, the input circuits for the data signalling system require only two pairs of wires so that a standard telephone JKT line cord can be used as the control cable. In addition, the FIG. 5 embodiment is suitable for use with area telephones of either the dial pulse type or the Touch-Tone type.

In accordance with the invention, each of the electronic data signalling system embodiments is conveniently arranged in the form of a self-contained desk top unit U having a conventional 110 volt AC power cord and having a control cable for connection to a selected one of the telephone PABX trunk lines. No additional equipment is required to permit the unit to respond to and record data supplied over any one of the area telephones and no modifications of any type need be made to the conventional telephone system so that installation is of utmost simplicity.

In the embodiments shown herein for purposes of illustrative disclosure, a digital panel printer designated generally at 11 in FIGS. 1, 2, 4A, 4B and 5, provides the data display and data recording functions. The printer shown herein is the Datel Systems Model DPP-7A5 type and the detailed circuitry disclosed herein is arranged for direct interconnection with that particular printer, but as will become clear to those skilled in this art, the invention is not limited to use with such a printer.

As shown in FIG. 1, the printer 11 is arranged as a plug-in unit disposed centrally in the front panel of the desk top unit U and normally is fixed in place by a thumb screw 11T to allow for convenient removal of the printer for replacing the paper tape t on which the data is displayed and recorded. The illustrated printer model has a six-column print format arranged with a first group of four digits, a blank space and a second group of two digits. The printed character is in the form of a conventional seven segment digit. The printer also contains the electronics for the print functions and includes a power supply having a +5 volt logic supply both for the printer components and also for the signal processing circuitry of this invention.

The particular printer accepts full parallel BCD inputs for the six data columns followed by a print command signal. While the printer is a numeric printer, adaptations are made to the inputs to columns five and six of the printer's logic to cause the device to print alpha characters for facilitating interpretation and clarity of the data read-out.

For purposes of illustrative disclosure, the electronic signalling system of the invention is described in connection with a typical hotel/motel application for providing data as to room status. Specific details given in connection with such a typical operation are for the purpose of illustrative disclosure and not for limiting the scope of the invention or its application to other uses.

Typically, the status system unit U is connected to a selected one of the telephone PABX trunks such that any one of the area telephones T may communicate with the status system unit by first dialing an access digit for selecting the corresponding pre-assigned PABX trunk. In addition, more than one of the desk top units may be connected to the same PABX system. For example, one unit may be located at the main desk and another unit may be located at the housekeeper station. The area telephones may include not only the telephones in each guest room, but one or more maid's phones or administrative personnel's phones. In addition, a restaurant cashier's phone may access the status system of this invention to record restaurant charges to a guest's room account.

For application as a room status system, the first four data columns of the printer 11 are available to show the particular room number. In larger motel operations four digits are required, but in smaller operations where only three digits or less are required, appropriate wiring modifications can be made to bypass or disable the 3rd or 4th printer columns. Normally, however, for recording restaurant guest charges, four digits are required and, for the particular printer arrangement described herein, a set of four digits must be dialed to locate the decimal point in the correct position. Thus, four digit amounts such as 12.98 automatically will print with a decimal point as shown in the top line on the tape which is here shown also includes the symbol Fd for food. If a restaurant charge were $2.98, it is necessary to first dial a zero, followed by the digits 298 in order to have the decimal point at the correct location. As shown on the tape, the symbol Li is next to the $2.98 to indicate that the charge was for liquor. Referring again to the tape, three status conditions relating to the guest room itself are shown wherein CL denotes that the room is clean, HP denotes that a housekeeper is needed and OC denotes that the room is occupied and cannot be cleaned. Because of special wiring applied to the printer, the symbol CL is printed in response to the dialing of digit 2 which corresponds to the letters ABC on the phone dial. Similarly, HP is printed in response to dialing of the digit 4 and OC is printed in response to the dialing of digit 6. For the restaurant charges, the symbol Fd is printed in response to dialing of the digit 3 and the symbol Li is printed in response to dialing of digit 5.

The general operating procedure of the system, for example, as used by a maid to signal the status of a particular room is as follows: (1) lift the telephone handset and listen for the dial tone and dial the access digit 7; (2) if a busy tone is heard, the signalling system is in use and the maid must hang up and dial again; (3) if the unit is available an answer beep is transmitted to the area telephone; (4) the maid then dials the room number followed by one of the status codes previously described; and (5) the maid hangs up the telephone handset to send a print command signal to the unit to cause the room number and status symbol to be printed on the tape.

A somewhat similar procedure is followed for recording restaurant charges. In this case the cashier picks up the handset and dials the access signal 7 to cause the telephone system to seize the electronic status unit U which emits the answer beep for about one-half second. The cashier then dials the guest's room number and the status digit 7 for a restaurant charge. The printer is specially wired to respond to the status digit 7 to immediately print the room number followed by the symbol CG. The cashier hears an audible tone during this printing cycle. The signalling unit automatically resets and activates a decimal point enable circuit to cause a decimal point to appear between the second and third digits of the next entry. The cashier then dials in a four digit set representing the actual charge and the proper status digit. If the actual charge requires three digits or less, the printer automatically blanks the leading zeros. The cashier hangs up the phone and the dollar amount and code are printed on the line following the room number and charge code.

DIAL PULSE EMBODIMENT

Figure 4A:
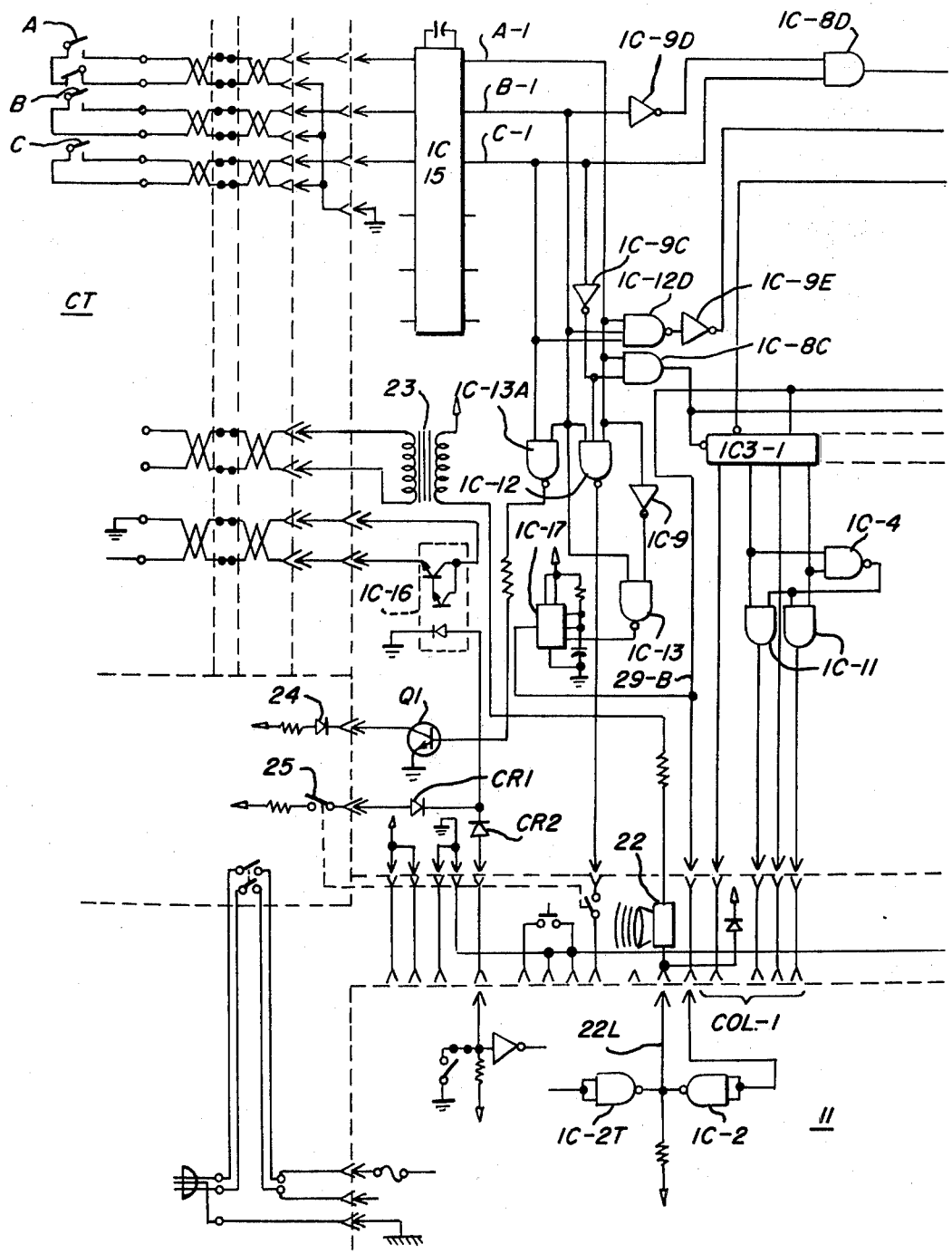
FIGS. 4A and 4B, taken together, comprise a composite detailed wiring diagram for the FIG. 2 embodiment.
Figure 4B:
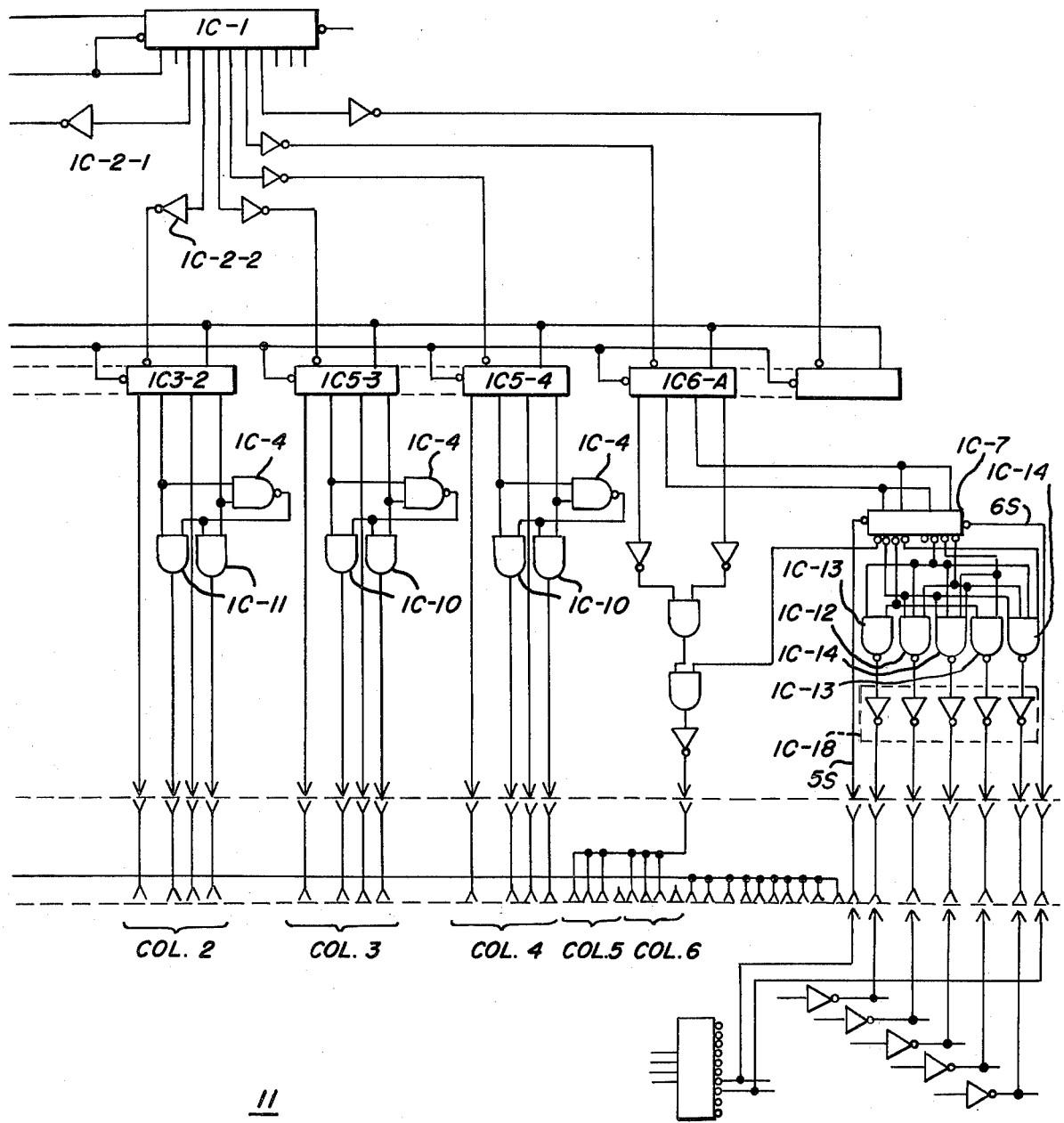

The embodiment shown in FIG. 2 and in FIGS. 4A and 4B is arranged for connection to certain existing in-house telephone systems having dial pulse type area telephones. The telephone PABX trunk to which the electronic data signalling system is connected may be completely conventional and thus, typically includes three relays commonly referred to in the art as the A, B and C relays which include A, B, C contacts as shown in FIG. 4A. The A, B, C relay contacts generate the actual dial signals which are supplied through the telephone PABX trunk to the electronic data system of this invention.

Figure 3:
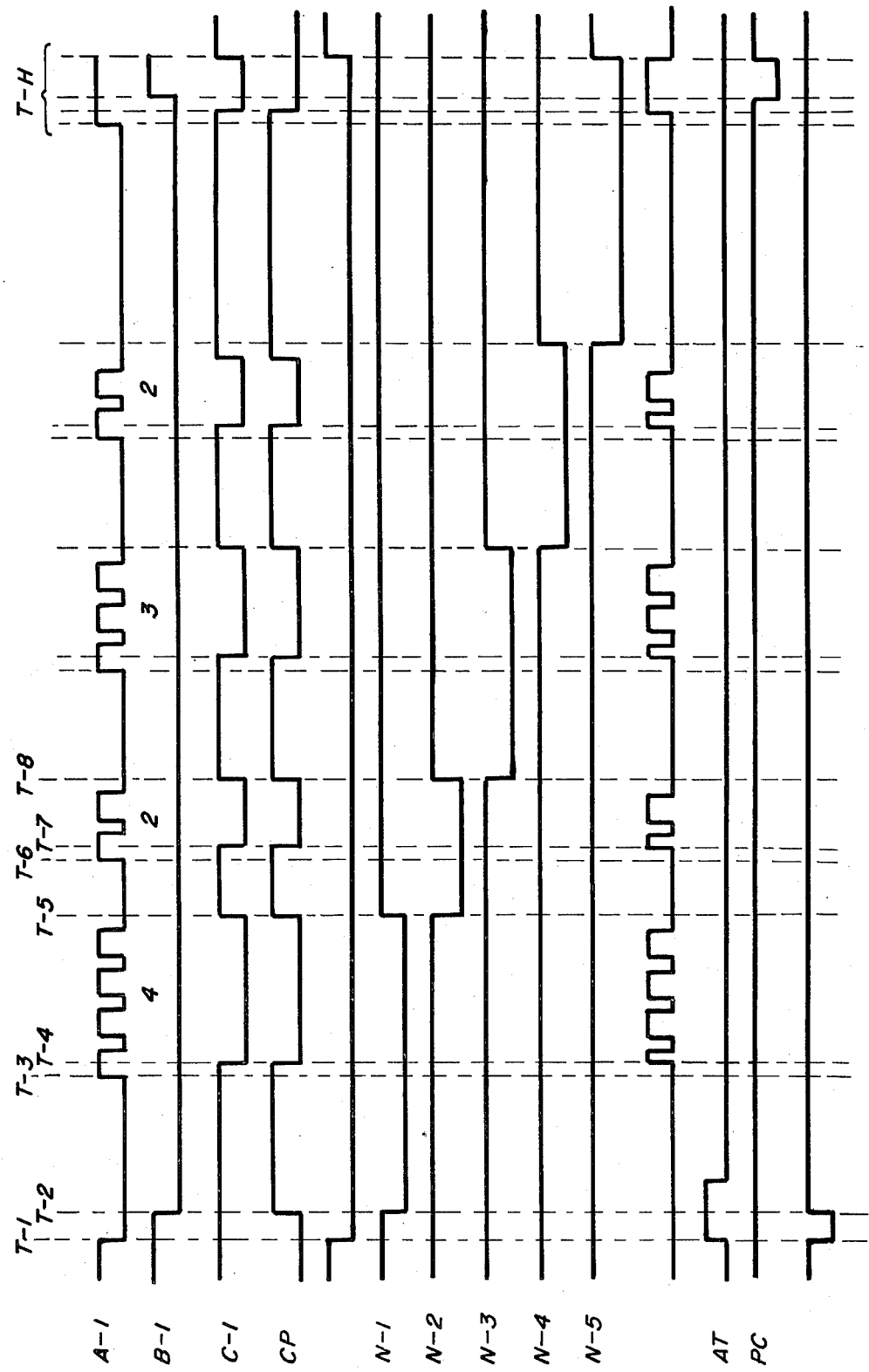
FIG. 3 is a digital timing chart illustrating the typical signal patterns occurring in the operation of FIG. 2 embodiment.

Referring to FIG. 3, a dial pulse signal pattern representative of the A, B, C relay inputs is shown for an illustrative sequence wherein the user dials the pre-assigned access digit 7 (to cause the PABX trunk to seize the electronic data system) followed by the digits 4232. The waveforms A-1, B-1, C-1 in FIG. 3 show the relay generated signal pattern.

The A contact closes at time T-1 when the telephone PABX trunk is dial accessed. Operation of the A relay energizes the B relay whose contacts close at T-2 and remain closed for the duration of the call. Beginning at T-3, the A contact opens and closes (or pulses) in unison with the dialing of digits and provides a pulse train to the input logic of the signalling system. Thus, beginning at time T-3, the A relay pulses four times to represent dialing of the digit 4. The C contact closes shortly after the A contact begins pulsing to provide a signal indicating that a digit is being dialed. In FIG. 3 the C contact is shown closing at time T-4 and opening at time T-5. Similarly, beginning at time T-6, the A relay pulses twice with the C closing beginning at time T-7 and opening at T-8. The remainder of the dialing is evident in the digital time chart.

The input section of the signalling system unit as shown in both FIGS. 2 and 4A includes an integrated circuit IC-15 functioning as a contact bounce eliminator to condition the relay contact closures into clean logic signals and thereby avoid any false signalling in the high speed digital circuits. Thus, the wave forms A-1, B-1 and C-1 in FIG. 3 may be understood as being the output signals from the contact bounce eliminator IC-15 as shown in FIG. 4A.

As shown generally in FIG. 2, the input logic signals derived from the contact bounce eliminator IC-15 are applied to a set of gates including an answer gate 20 which is connected to trigger an answer tone timer 21 when the status unit is first seized by the telephone PABX trunk. The timer 21 generates a pulse typically of one-half second duration to activate an answer circuit 22 consisting of an audio tone generator and transformer which connects to the trunk through one of the five wire pairs previously referred to. The timer 21 is connected by wire 29 B to reset storage counter 29 to clear it of previously stored binary data. The circuitry for the described answer function is shown in FIG. 4A wherein the answer gate is shown to include an inverter gate IC-9 and a NAND gate IC-13 connected to actuate a timer IC-17 which has a connection path to a tone generator 22, such as a Mallory SC628 Sonalert, for sounding a one-half second audible tone as indicated at AT in FIG. 3. For convenience, the connection path to the tone generator 22 is made through printer terminal connections and a spare NAND gate IC-2 within the printer 11 in the case of the particular illustrated embodiment. The audio tone signal from the generator 22 is coupled through a transformer 23 to the PABX trunk to notify the user that the status unit has been seized in response to the dialing of the access signal digit 7.

The status unit has an indicator light 24 on its front panel as shown in FIG. 1 to indicate that the telephone system has been made "busy" whenever one of the area telephones has accessed the connecting trunk or whenever a normal/busy switch 25 on the front panel is in "busy" position or whenever the printer 11 is out of paper or is temporarily removed from the enclosure. When the busy light is lit, anyone dialing the status system will hear a busy tone generated by the PABX equipment.

With reference to FIG. 2, an in-use gate 26 is shown connected to receive the signals from the contact bounce eliminator IC-15 to act as a control gate for actuating the busy light 24 on the front panel. With reference to FIG. 4A, this function is served by the NAND gate IC-13-A which controls the voltage applied a transistor Q1 which has a light emitting diode 24 in its collector circuit to serve as the "busy" light on the front panel of the unit.

The primary control and interface circuitry for receiving signals from the telephone PABX trunk, as shown in block diagram form in FIG. 2, includes input circuitry having a digit clock gate 27 responsive both to the selection of the trunk line by an area telephone and to the dialing of each digit as received from the trunk line; and logic circuitry including a reset gate 27 A responsive to hang-up to reset counter 28; the digit enable counter 28 being incremented by a pulse CP (See FIG. 3) from the digit clock gate 27 and connected to a multi-section binary digit storage counter 29 to sequentially enable the proper digit storage counter section as the successive digits are dialed as is shown by the wave forms N-1 to N-5 in FIG. 3; and a pulse clock gate 30 responsive to the A relay input pulses and connected to all sections of the digit storage counter 29 to feed each such counter section a number of pulses equal to the number dialed for the corresponding digit. Thus, as each section of the binary storage counter 29 is successively enabled by the digit enable counter 28, it counts the A relay input pulses and stores such count in binary form for presentation to the printer inputs.

Thus, as illustrated in FIGS. 2, 4A and 4B, for a situation where four digit room numbers are to be printed, each of the sections IC-3-1, IC-3-2, IC-5-3 and IC-5-4 of the digit storage counter 29 corresponding to the first four columns connects directly to the first four input columns of the printer 11, whereas the storage counter section IC-6-A for the last digit that denotes the room status is connected through a unique alpha conversion logic 46 for converting the binary signal pattern corresponding to the particular status digit into appropriate inputs to columns 5 and 6 and to certain segment over-ride terminals of the printer for causing the single digit status code to produce a double letter print-out. Thus, after the user has dialed the complete sequence of digits which have been processed through the digital circuits, the signals are stored for presentation to the printer when the user hangs up the telephone handset and causes the PABX status trunk to drop the connection. The sequence of the A, B and C relays, as derived from the contact bounce eliminator IC-15, when the user hangs up as shown at T-H in the timing chart of FIG. 3, actuates a print command gate 31 to generate a print command pulse PC to cause the printer 11 to print the stored binary signal data.

The stored binary signals in IC-3-1, IC-3-2 and IC-5-3 and IC-5-4 for columns one to four directly control the printer's inputs. The stored binary signals in IC-6-A for columns 5 and 6 are processed by the alpha conversion logic 46 for presentation to the printer. The printer advances the tape and generates a print tone command signal that is applied to the generator 22 over line 22 L. At this same time, the digit enable gate 27 responds to the relay inputs associated with hang-up to reset the digit enable counter 28. The storage counter 29 will be reset by timer 21 as part of the answer tone sequence of the next call.

A specific circuit arrangement for the control and interface circuitry is given in FIGS. 4A and 4B wherein the digit clock gate 27 is shown to include an AND gate IC-8-D and associated inverter IC-9-D to increment the digit enable counter 28 as each digit is dialed and the reset gate 27 A is shown to include a NAND gate IC-12-D and an associated inverter IC-9-E to reset the digit enable counter 28 upon hang-up. The digit enable counter 28 consists of a decade counter IC-1 connected through a set of inverter gates IC-2, there being one inverter gate IC-2 connected to each section of the digit storage counter 29.

Correspondingly, the clock gate 30 consists of an AND gate IC-8-C and an inverter IC-9-C serving to combine the inputs to clock each section of the digit storage counter 29 in accordance with the number of A relay input pulses associated with that particular digit. As shown in FIGS. 4A and 4B, each integrated circuit element contains two sections of the digit storage counter 29. Thus, sections IC-3-1 and IC-3-2 are portions of a single integrated circuit element. Thus, the left hand section of IC-3-1 (See FIG. 4A) serves as the binary counter for the column 1 position of the printer 11 and it is enabled through the integrated circuitry IC-1 and IC-2-1 in order to receive, count and store the number of pulses representing the first digit dialed. With reference to FIG. 3, the wave form labeled N-1 shows that the binary counter section associated with column 1 is enabled during the dialing of the first digit so that the set of four clock pulses defining digit 1 are received and stored for presentation to the printer. The particular binary counter disclosed can present appropriate binary signals to the printer for any dialed digit between 1 and 9. In order to convert a dialed zero, which corresponds to ten pulses, into a binary zero, IC-4, IC-10 and IC-11 are provided.

When the second digit is dialed, it will be noted that the section IC-3-2 of the digit storage counter corresponding tio printer column 2 is enabled through the elements IC-1 and IC-2-2 (See FIG. 4B) so that the pulses supplied through the clock gate 30 (that is, elements IC-8-C and IC-9-C) are again counted and stored. Each room digit is similarly counted and stored and held for presentation to the printer.

The logic circuitry for columns 5 and 6 which are to print the status symbols derived from the last digit dialed is somewhat different. As indicated previously, the particular printer utilizes a seven segment print format, in that the seven segments define the number 8. In the illustrated arrangement, a binary 8 is hard wired to columns 5 and 6 inputs to activate all seven segments. In order to achieve print-out of alpha characters as previously described, it is necessary to over-ride the printer's logic to effect turn-off of selected ones of the seven segments. The alpha conversion logic 46 for performing this function includes a digit recoder 46 D to receive binary signals (from storage counter section IC-6-A) representative of the last dialed digit that corresponds to the status code. Outputs from the digit decoder 46 D are fed through a set of alpha gates 46 G, each of which connects to a separate segment gate 46 S which, in turn, are connected to the segment driver logic within the printer to over-ride selected printer segment drivers and cause the printer to produce the desired two letter status symbol in response to a single dialed digit. The digit decoder 46 D is shown at IC-7 in FIG. 4B; its outputs being connected to a set of alpha gates identified as IC-12, IC-13 and IC-14, each of which operates through a separate section of segment gate IC-18.

With reference to the alpha conversion logic shown in FIG. 4B, the digit decoder 46 D or IC-7 is a dual one four type and serves to decode the status digit stored in the section IC-6-A into one of a plurality of signals, each of which corresponds to one of the pre-determined status conditions for which the unit is wired. In FIG. 4B, only three status conditions are shown in the wiring. These corresponding to the room status, but additional conditions can be wired to provide for the restaurant status symbols or other functions.

As indicated previously, the actual printing sequence occurs in response to the user completing the dialing sequence and hanging up the handset, the print command signal being transmitted through the print command gate 31 defined by the element IC-12 of FIG. 4A. During the actual print cycle, one-half of the digit decoder IC-7 is enabled by the printer through select wire 5 S when it is ready to print column 5. The other half of the decoder is enabled through select wire 6 S for column 6. Thus, the alpha signals appear at the inputs of the printer only when the printer is ready to print the alpha status characters in order to avoid interfacing with columns 1 to 4.

In instances where the area telephones are identified by only two digit or three digit room numbers rather than four digits, only the necessary number of digit storage counters are connected to be enabled from the digit enable counter. For example, in a two digit room number system, the storage counters in column positions one and two would be enabled while the counters in column positions three and four would not be enabled. This is effected by re-connecting the third enable lead that is normally associated with the third dialed digit so that it feeds the storage counter section corresponding to column positions 5 and 6. In such a situation, the paper tape print-out would contain a two digit room number, two blank columns and the double character status code.

The particular printer model includes internal circuitry IC-2-T which is connected through line 22 L to actuate the tone generator 22 for aobut ⅓rd second during the actual printing sequence; thus indicating the entering of a new status condition.

Also, after the user hangs up, the busy indicator light 24 on the front panel is turned off in response to de-energization of B and C as shown at T-H in FIG. 2. The light 24, as shown in FIG. 4A, is turned off by IC-13-A and Q1.

Where the system of FIG. 2 is to also perform the additional functions of recording restaurant charges, the cashier would access the unit through the same PABX trunk and dial the number of the guest room in the sequence just described but then would dial the special status code digit 7 (orR) in order to indicate the restaurant charge function by symbol CG. Thus, a charge code detector 32 is connected to the output of the alpha digit decoder 46 D to respond only to the binary combination that represents the charge code digit R. The charge code detector 32 is connected to actuate the print command gate 31 to cause the printer to print even though the cashier did not hang up after dialing the charge code digit R.

During the print sequence, the room number and code CG are printed and the cashier hears an audible tone triggered by the circuit IC-2-T within the printer. As shown in FIG. 2, the charge code detector also triggers a reset counter timer 33 to clear the digit enable counter 28 through digit clock gate 27 and to reset digit storage counter 29 through pulse clock gate 30. The reset timer 33 is set to provide the printer sufficient time to print the stored room number and charge code before the counter information is reset. When the timer circuit 33 clears the counters, it is then effective to activate a decimal point enable gate 34 which is connected to a pre-existing input on the printer to cause a decimal point to appear between the second and third digits of the next entry to be printed. Thus, when the cashier dials in the four digit dollar amount followed by a food or liquor code, this data is printed out in the manner previously described when the cashier hangs up the handset.

As shown in FIGS. 2 and 4A, the normal/busy switch 25 or the printer end-of-paper terminal are connected to an OR gate 35 (FIG. 2) which is shown as CR-1 and CR-2 in FIG. 4A to trigger an optical coupler 36 (FIG. 2) which is shown at IC-16 in FIG. 4A. The coupler 36 energizes the trunk C relay to make the trunk busy.

PREFERRED EMBODIMENT

Referring to FIG. 5, it will be noted that the functional block diagram for the preferred embodiment includes many components identical to those appearing in the embodiment shown in FIG. 2. Such corresponding components are identified by identical reference characters. The preferred embodiment includes a number of additional features and improvements which are highlighted by providing dotted line enclosures around the additional components. In addition, the preferred embodiment requires only four wires for connection to the telephone PABX trunk so that it minimizes installation labor and material costs. In the case of the interface circuitry, the contact bounce eliminator IC-15 is replaced in the preferred embodiment by an interface circuit designated generally at 115 which is connected to a wire pair that transmits the A relay contact closures to the electronic signalling unit. The A signal passes unchanged through a line polarity reversing circuit 115 R to the primary side of an impedance matching transformer 115 T which couples the A signal to an optical coupler 115 A which provides isolation between the PABX relay contacts and the integrated circuit logic of the electronic signalling system. The output wave form from the coupler 115 A is synchronized with the opening and closing of the A relay contact and thus generates a wave form like that shown at A-1 in FIG. 3. The optical coupler 115 A is connected to activate a timer 115 B which stays energized for the duration of the call to produce a wave form like that shown at B-1 in FIG. 3 which is a duplicate in function of the trunk B relay contact previously described.

When connected to a rotary dial telephone system, the output of optical coupler 115 A will be of the form of A-1 in FIG. 3. When connected to a tone dial telephone system, the output of optical coupler 115 A will follow the A contact closure pattern as determined by the dial tones acting on the trunk.

Thus, the rotary dial system is considered first. Outputs from the optical coupler 115 A and from the timer 115 B are connected to a gate 115 AB, typically a NAND gate and an inverter to trigger a timer 115 C when B-1 is energized and A-1 opens. If A-1 continues to pulse at the conventional telephone dial pulse rate, 115 B responds to this to maintain B-1 energized, and timer 115 C responds to A-1 through 115 AB to maintain C-1 energized for generating the wave form shown at C-1 in FIG. 3. Thus, the elements 115 A, 115 B and 115 C respond only to A signals but are arranged to present A-1, B-1 and C-1 signals of the same form as described in connection with the embodiment of FIG. 2.

Thus, the optical coupler 115 A has the sole function of presenting a clean signal corresponding to the A relay closures. The timer 115 B functions as a generator for the B-1 signal in that the action of its time delay creates a B-1 signal duplicating the B-1 trunk signal providing the A-1 input indicates the trunk is still seized. The timer 115 C functions as a generator for the C-1 signal when supplied with the correct A-1, B-1 signals.

In the preferred embodiment of FIG. 5, the output circuitry includes a disconnect timer 37 which is connected to respond to the output from the timer or generator 115 B and which is connected to control the line polarity reversing circuit 115 R in order to command the telephone PABX trunk to disconnect the calling party after the elapse of a specified time interval (30–45 seconds) during which the user fails to dial in the room data. Thus, the disconnect timer 37 functions to prevent the system from being inadvertently tied up by someone failing to hang-up the telephone handset. Line polarity reversal is a common telephone signalling means and is used here merely to signal the PABX trunk to disconnect the user who has failed to hang-up.

An important practical feature of the preferred embodiment is that its circuitry is universal in that it allows the signalling system to respond either to push button tone dial phones or to the rotary dial pulse phones. It is sufficient to note that where rotary dial phones are used in conjunction with the FIG. 5 embodiment, the signal pattern produced at elements 115 A, B and C feeds logic elements 27, 27 A, 28, 29 and 30 identical to those previously described in connection with the embodiment of FIG. 2 and the signal conversion storage and recording occurs in the same fashion as already described.

When the signalling system is used in conjunction with a push button tone type dialing system, the input circuitry 27 still receives an A contact closure signal from the PABX when the user dials the access digit and causes the trunk to seize the electronic signalling system. The optical coupler 115 A and the timer 115 B generate the A-1 and B-1 signals, but since A relay in the tone dialing system does not pulse, no C signal is generated except on hang-up.

In the tone dialing sequence, the audio tones are coupled through the impedance matching transformer 115 T to a tone dial digit decoder 38 which functions to detect and convert the correct audio tones into a binary number corresponding to the digit that was tone-dialed. In addition, the tone dial digit decoder circuits generate a valid digit signal $V_d$ on line 38 L only when valid telephone tone dial signals corresponding to a dialed digit are detected. This signal is fed to the input gate 27 to condition the logic circuitry to respond to subsequent dial signals to serve the same function as the C-1 signals of the previous embodiment in that the valid digit signal indicates that a digit is being dialed.

Thus, the logic circuitry still has the required three input signals --A-1, B-1 and $V_d$ which replaces and corresponds to the C-1 signal. The hang-up sequence which previously generated a C-1 signal still produces a C-1 signal from gate 115 AB and timer 115 C. Gate 115 AB derived the C-1 signal in that A-1 output from the coupler 115 A de-energizes before B-1 output from the timer 115 B as indicated at T-H in FIG. 3. Thus, the print command signal is transmitted from 115 C to the print command gate 31 to actuate the printer 11.

Since the digit storage counter 29 in the preferred embodiment is required to respond either to dial pulse or tone dial signals, it uses integrated circuit binary counters that may be preset or loaded directly with a binary number or clocked to a particular binary number. If the signalling system is connected to a rotary dial telephone system, the sections of the storage counter 29 are enabled, in turn, by the digit enable counter 28 and clocked to the correct binary number by clock pulse gate 20 in response to pulsing of the A-1 signal. The digit enable counter 28 is advanced by each digit clock pulse from gate 27.

If the signalling system is connected to tone dialing equipment, the decoder 38 detects the tones, generates $V_d$ on line 38 L and generates the correct binary number. This number is fed to the preset inputs of the digit storage counter 29. The leading edge of signal $V_d$ loads this number into the storage counter section that is enabled by digit enable counter 28. The trailing edge of signal $V_d$ triggers the digit clock gate 27 to produce a digit clock pulse that advances the counter 28 to the next count. The circuits are now ready to accept new tones to be decoded and loaded into the next enabled storage counter section.

A memory 39 is included so that room numbers which fall into certain status categories may be stored, as they are dialed into the signalling system for future recall by the motel clerk. For example, if the digit decoder 30 D signals a room's status as being clean CL, it signals the memory control 40 to store the room's number and status as it is being printed on the paper tape. At some later time, the desk clerk operates front panel controls (not shown) to signal the memory control 40 over line 40 L to provide a summary print-out of all rooms that are clean as stored in the memory. Line 40 L is connected through OR gate 35 to optical coupler 36 to make the PABX busy so that no one may call during the print-out. A room's status in memory may be changed by simply dialing in the room number and its new status. Each room number has a unique location in memory along with its current status. The memory control 40 through gate 41 generates the print commands for the summary print-out. The room number outputs from the memory 39 over line 39 L go to the printer through the multiplexer 42 and the status output from the memory 39 over line 39 S goes to alpha gates 46 G to disable the proper segments in the alpha columns as previously described.

Solid-state digital clock circuits 43 drive a front panel display 44 and also provide binary time of day information to the printer 11 through the multiplexer 42. Push buttons may be provided on the front panel to set the correct time into the clock circuits over line 44 L.

After information has been dialed in, the time of day will be printed on one line of the paper tape; the room number and status on the next line. This information may be used to monitor the progress of room cleaning. For example, the maid could dial in a certain status condition to indicate that she has entered a room to begin cleaning. This code would be printed along with the time of day. As the maid leaves the room, she would dial a different code to indicate that it is clean. This would be printed along with the time.

The multiplexer 42 and its control 45 select, at the proper time, the information to be presented to the printer's inputs. Upon hang-up of the telephone, the multiplexer control circuits 45 select the binary clock information and present it to the printer to be printed, and then the circuits 45 select the information from the digit storage counter 29 and generate another print command to print out the room and status on the next line.

When a summary print-out is requested, the memory control 40 triggers the multiplex control over line 40 M to present the memory outputs to the printer and generate the necessary print commands.

Thus, while preferred constructional features of the invention are embodied in the structure illustrated herein, it is to be understood that changes and variations may be made by those skilled in the art without departing from the spirit and scope of the appended claims.

| LIST OF INTEGRATED CIRCUIT PARTS OF THE FIG. 2 EMBODIMENT | |
|---|---|
| IC-1 - 4017 PC | IC-10 - 4081 PC |
| IC-2 - 4069 PC | IC-11 - 4081 PC |
| IC-3 - 4520 PC | IC-12 - 4023 PC |
| IC-4 - 4011 PC | IC-13 - 4011 PC |
| IC-5 - 4520 PC | IC-14 - 4012 PC |
| IC-6 - 4520 PC | IC-15 - MC14490 VP |
| IC-7 - 4556 PC | IC-16 - MOC8050 |
| IC-8 - 4081 PC | IC-17 - NE555V |
| IC-9 - 4069 PC | IC-18 - 7405 |

What is claimed is:

1. A data signalling system operable through an in-house telephone system that includes a plurality of area telephones each having a telephone line, a plurality of trunk lines, and central telephone switching means operable to selectively control connection of the telephone lines to the trunk lines, said signalling system having input digit clock means connected to produce a first digit clock signal in response to selection of one of the trunk lines by any selected one of the area telephones and connected to produce a sequential digit clock signal in response to each subsequently dialed digit received from said trunk, logic means responsive to each digit clock signal to receive from the selected trunk line each sequentially transmitted set of conventional digit defining telephone dial signals transmitted by the selected area telephone and to convert each set to a separate corresponding set of digital signals representative of the corresponding dialed digit, and utilization means responsive to each separate set of digital signals to provide read-out representative of said sets of telephone dial signals.

2. A data signalling system as defined in claim 1 and wherein said utilization means is a printer.

3. A data signalling system as defined in claim 1 and wherein said logic means includes means for storing each set of digital signals and said utilization means being responsive when the logic means converts a pre-selected one of the sets of conventional telephone dial signals to a corresponding set of digital signals to provide a display representative of the complete set of digital signals.

4. A data signalling system as defined in claim 1 and wherein said logic means includes means for storing each set of digital signals and said utilization means being connected to receive the sets of digital signals stored in the logic means and being responsive to a signal derived from the selected trunk line to produce the digital read-out.

5. A data signalling system as defined in claim 1 and wherein said logic means includes means for storing each set of digital signals and wherein said utilization means comprises a printer connected to receive the stored sets of digital signals from the logic means and responsive to a signal from the selected trunk line to produce a display representative of the complete set of digital signals.

6. A data signalling system as defined in claim 1 wherein said signalling system has means for presenting a signal pattern corresponding to conventional A and B trunk relay signals associated with selection of the trunk and wherein said input means is responsive to said signal pattern to produce said first digit clock signal.

7. A data signalling system as defined in claim 1 wherein said signalling system has means for presenting a signal pattern corresponding to conventional A and B trunk relay signals associated with selection of the trunk and control gate means responsive to said signal pattern to operate in pre-determined timed relation to the selection of the trunk.

8. A data signalling system as defined in claim 7 and including answer tone generating means responsive to said control gate means.

9. A data signalling system as defined in claim 1 wherein said signalling system has means for presenting a signal pattern corresponding to conventional A, B and C trunk relay signals associated with disconnection of the selected trunk and a control gate means responsive to said signal pattern to operate in pre-determined timed relation to the disconnection of the trunk.

10. A data signalling system as defined in claim 1 wherein said signalling system has means for presenting a signal pattern corresponding to conventional A, B and C trunk relay signals of the digit defining type generated in a rotary dial telephone system and wherein said logic means is responsive to said signal pattern.

11. A data signalling system as defined in claim 10 and wherein said logic means includes digit enable counter means responsive to each digit clock signal from said input means, pulse clock gate means responsive to said signal pattern to generate a number of pulses representative of the dialed digit, counter means responsive to said digit enable counter means and said pulse clock gate means to present, separately, for each digit dialed, the corresponding set of digital signals.

12. A data signalling system as defined in claim 10 and wherein said logic means includes tone dial detection and decoding means responsive to each set of tone dial signals received from the selected trunk to present a corresponding set of digital signals.

13. A data signalling system as defined in claim 1 wherein said signalling system has means for presenting a signal pattern corresponding to conventional digit defining tone dial signals and wherein said logic means includes detecting and decoding means responsive to each signal pattern to present a corresponding set of digital signals.

14. A data signalling system as defined in claim 1 and wherein said utilizing means is a printer, said system including digital time clock means for presenting sets of digital signals representative of time of day data, multiplexing means to selectively present to the printer sets of digital signals derived from the clock means and the logic means, and gate means responsive to a signal from the trunk line for controlling the multiplexing means.

15. A data signalling system as defined in claim 1 and including memory means to store sets of digital signals, gating means responsive to pre-determined sets of digital signals from said logic means to load the same into the memory means, multiplexing means to selectively present to the utilization means sets of digital signals derived from the memory means and the logic means, and means for controlling the multiplexing means.

* * * * *